(12) United States Patent
Wu et al.

(10) Patent No.: US 9,503,130 B2
(45) Date of Patent: Nov. 22, 2016

(54) SIGNAL TRANSMITTER, MESSAGE GENERATING SYSTEM AND SIGNAL POWER ADJUSTING METHOD

(71) Applicant: INSTITUTE FOR INFORMATION INDUSTRY, Taipei (TW)

(72) Inventors: Yeh-Kuang Wu, New Taipei (TW); Liang-Chun Chang, Taipei (TW); (Continued)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 39 days.

(21) Appl. No.: 14/543,902

(22) Filed: Nov. 18, 2014

(65) Prior Publication Data

US 2016/0112076 A1 Apr. 21, 2016

(30) Foreign Application Priority Data

Oct. 20, 2014 (TW) .............................. 103136169 A

(51) Int. Cl.
*H04B 1/04* (2006.01)
*H04W 4/00* (2009.01)
(Continued)

(52) U.S. Cl.
CPC ............ *H04B 1/0475* (2013.01); *H04B 17/27* (2015.01); *H04W 4/008* (2013.01); *H04W 52/0238* (2013.01); *H04B 2001/0416* (2013.01)

(58) Field of Classification Search
CPC ............ H04W 4/008; H04W 52/0238; H04M 1/7253; H04M 1/0277; H04M 1/0249;
(Continued)

(56) References Cited

U.S. PATENT DOCUMENTS 5,603,103 A * 2/1997 Halttunen ............ H04B 1/3833
174/395
5,995,854 A * 11/1999 Wilson .................... H01Q 1/245
343/702
(Continued)

FOREIGN PATENT DOCUMENTS

CA   EP 1780987 A1 * 5/2007 .......... H04M 1/0237
CN   102589096 A    7/2012
(Continued)

OTHER PUBLICATIONS

The office action of the corresponding Korea application issued on Jan. 28, 2016.

*Primary Examiner* — Andrew Wendell
*Assistant Examiner* — Maryam Soltanzadeh
(74) *Attorney, Agent, or Firm* — CKC & Partners Co., Ltd.

(57) ABSTRACT

A signal transmitter with adjustable signal power includes a housing, a first adjustable metal shielding layer and a circuit board. The first adjustable metal shielding layer is disposed within the housing. The area of the first adjustable metal shielding layer consists of a first shielding area and a first un-shielding area. The first shielding area and the first un-shielding area are adjustable. The circuit board is disposed within the housing, and is located below the first adjustable metal shielding layer. The circuit board is electrically connected with the first adjustable metal shielding layer, and includes a signal emission chip. The signal emission chip is configured for adjusting signal emission power to emit a signal according to the first un-shielding area of the first adjustable metal shielding layer. A message generating system and a signal power adjusting method are disclosed herein as well.

16 Claims, 6 Drawing Sheets

(72) Inventors: Hui-Chun Wang, New Taipei (TW);
Wen-Tai Hsieh, Taipei (TW);
Hsiao-Chen Chang, Taipei (TW)

(51) Int. Cl.
*H04W 52/02* (2009.01)
*H04B 17/27* (2015.01)

(58) Field of Classification Search
CPC ............... H04M 1/0206; H04M 1/02; H04M 1/03; H04M 1/62; H04B 1/0475; H04B 17/27; H04B 2001/0416; H04B 1/3833; H04B 1/03
See application file for complete search history.

(56) References Cited

U.S. PATENT DOCUMENTS

| | | | |
|---|---|---|---|
| 8,843,061 B2* | 9/2014 | Rofougaran | H01Q 1/2283 455/121 |
| 2001/0018123 A1 | 8/2001 | Furumori et al. | |
| 2005/0029919 A1 | 2/2005 | Notohara et al. | |
| 2007/0273602 A1* | 11/2007 | Zhu | H01Q 1/243 343/841 |
| 2010/0157545 A1* | 6/2010 | Lehtimaki | H05K 1/0218 361/728 |
| 2012/0112552 A1* | 5/2012 | Baarman | H05K 9/002 307/104 |
| 2012/0252373 A1* | 10/2012 | Saito | G04C 17/0066 455/73 |
| 2012/0285737 A1 | 11/2012 | Judy et al. | |
| 2014/0243749 A1* | 8/2014 | Edwards | A61M 5/31 604/187 |

FOREIGN PATENT DOCUMENTS

| | | |
|---|---|---|
| JP | 11-136354 A | 5/1999 |
| JP | 2011-041211 A | 2/2011 |
| KR | 2013-0085117 A | 7/2013 |
| TW | 200805776 A | 1/2008 |

* cited by examiner

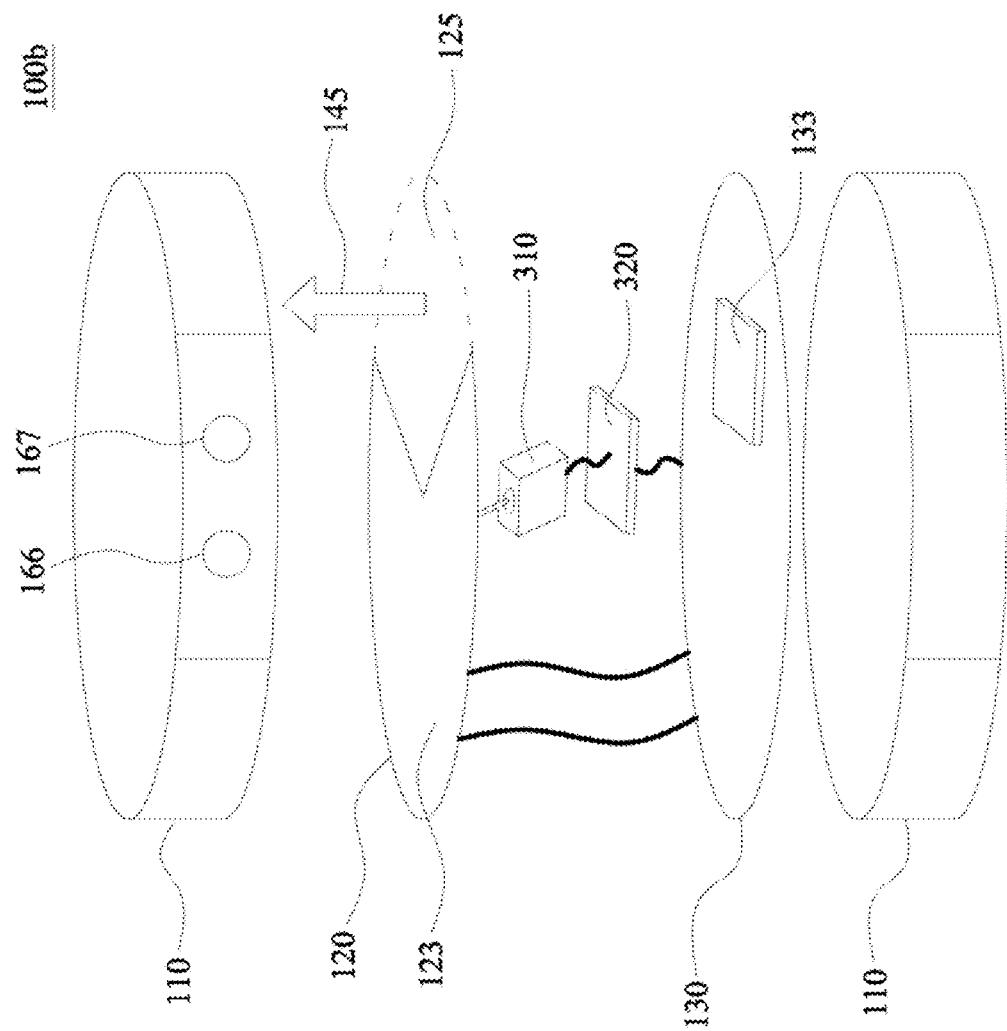
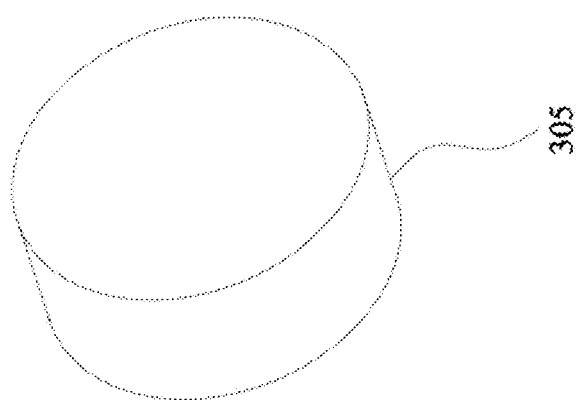
Fig. 3

SIGNAL TRANSMITTER, MESSAGE GENERATING SYSTEM AND SIGNAL POWER ADJUSTING METHOD

RELATED APPLICATIONS

This application claims priority to Taiwan Application Serial Number 103136169, filed Oct. 20, 2014, the entirety of which is herein incorporated by reference.

BACKGROUND

1. Technical Field

The present disclosure relates to a signal transmitter. More particularly, the present disclosure relates to a signal transmitter with adjustable signal power and a signal power adjusting method.

2. Description of Related Art

With the development of information technology, various electronic products are widely applied in daily life such that people nowadays enjoy more convenient livings. A low-power bluetooth transmitter transmits low-power bluetooth signals such that when a mobile device receives the above-mentioned bluetooth signals, the mobile device can execute corresponding functions (e.g., receiving product introducing messages, advertisement messages or guiding messages).

The advantages of low-power bluetooth transmitters include compact size, easy installation, low-power consumption and high mobility. However, most of conventional low-power bluetooth transmitters emit signals in all directions, and the emission power cannot be adjusted. Therefore, it is not possible to control the direction and the power of the emitted bluetooth signal. Consequently, it is not convenient to utilize and plan the locations for placing the signal transmitters. Moreover if there are overlapping parts between the covering areas of the bluetooth signals emitted by neighboring low-power bluetooth transmitters, there will be mutual interface between the signals. Also, the mobile device may receive two or more than two bluetooth signals simultaneously such that the mobile device is not able to determine which bluetooth signal it shall utilize. Consequently, the mobile device may not able to execute corresponding functions under some business applications.

SUMMARY

In one aspect, the present disclosure is related to a signal transmitter with adjustable signal power. The signal transmitter includes a housing, a first adjustable metal shielding layer and a circuit board. The first adjustable metal shielding layer is disposed within the housing. The area of the first adjustable metal shielding layer consists of a first shielding area and a first un-shielding area. The first shielding area and the first un-shielding area are adjustable. The circuit board is disposed within the housing, and is located below the first adjustable metal shielding layer. The circuit board is electrically connected with the first adjustable metal shielding layer, and includes a signal emission chip. The signal emission chip is configured for adjusting signal emission power to emit a signal according to the first un-shielding area of the first adjustable metal shielding layer.

In another aspect, the present disclosure is related to a message generating system. The message generating system communicates with at least one mobile device through a communication network. The message generating system includes a management module, a message transmitting module and at least one signal transmitter. The message transmitting module is electrically connected with the management module. Each of the at least one signal transmitter includes a first adjustable metal shielding layer and a circuit board. The area of the first adjustable metal shielding layer consists of a first shielding area and a first un-shielding area. The first shielding area and the first un-shielding area are adjustable. The circuit board is configured for adjusting signal emission power to emit a signal according to the first un-shielding area of the first adjustable metal shielding layer. The at least one mobile device transmits device information to the management module according to the signal emitted by the circuit board of the at least one signal transmitter. The management module stores apparatus information of the at least one signal transmitter and a corresponding message. When the management module receives the device information transmitted from the mobile device, the management module controls the message transmitting module to transmit the corresponding message to the mobile device according to the apparatus information corresponding to the device information.

In still another aspect, the present disclosure is related to a signal power adjusting method. The signal power adjusting method is applicable for at least one signal transmitter with adjustable signal power. Each of the at least one signal transmitter includes a first adjustable metal shielding layer and a circuit board. The area of the first adjustable metal shielding layer consists of a first shielding area and a first un-shielding area. The first shielding area and the first un-shielding area are adjustable, and the signal power adjusting method includes the following step: utilizing the circuit board of each of the at least one signal transmitter to adjust signal emission power to emit a signal according to the first un-shielding area of the first adjustable metal shielding layer.

By applying the techniques disclosed in the present disclosure, the user can control the direction, angle and power of the signal emitted by the signal transmitter by adjusting the shielding area of the adjustable metal shielding layer of the signal transmitter. Therefore, it is easier to plan the locations for placing the signal transmitters. Moreover, the signal transmitter can measure the distance from neighboring signal transmitter by receiving the signal from the neighboring signal transmitter. The signal transmitter can adjust the shielding area of the adjustable metal shielding layer and the signal emission power according to the measured distance. Therefore, when the distance between the signal transmitter and the neighboring signal transmitter is closer, the signal transmitter can increase the shielding area of the adjustable metal shielding layer, and lowers its signal emission power. The mutual interface between the signals emitted by neighboring signal generating apparatuses can be effectively reduced.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3 is a schematic diagram of a signal transmitter with adjustable signal power in accordance with one embodiment of the present disclosure;

DETAILED DESCRIPTION

Figure 1:
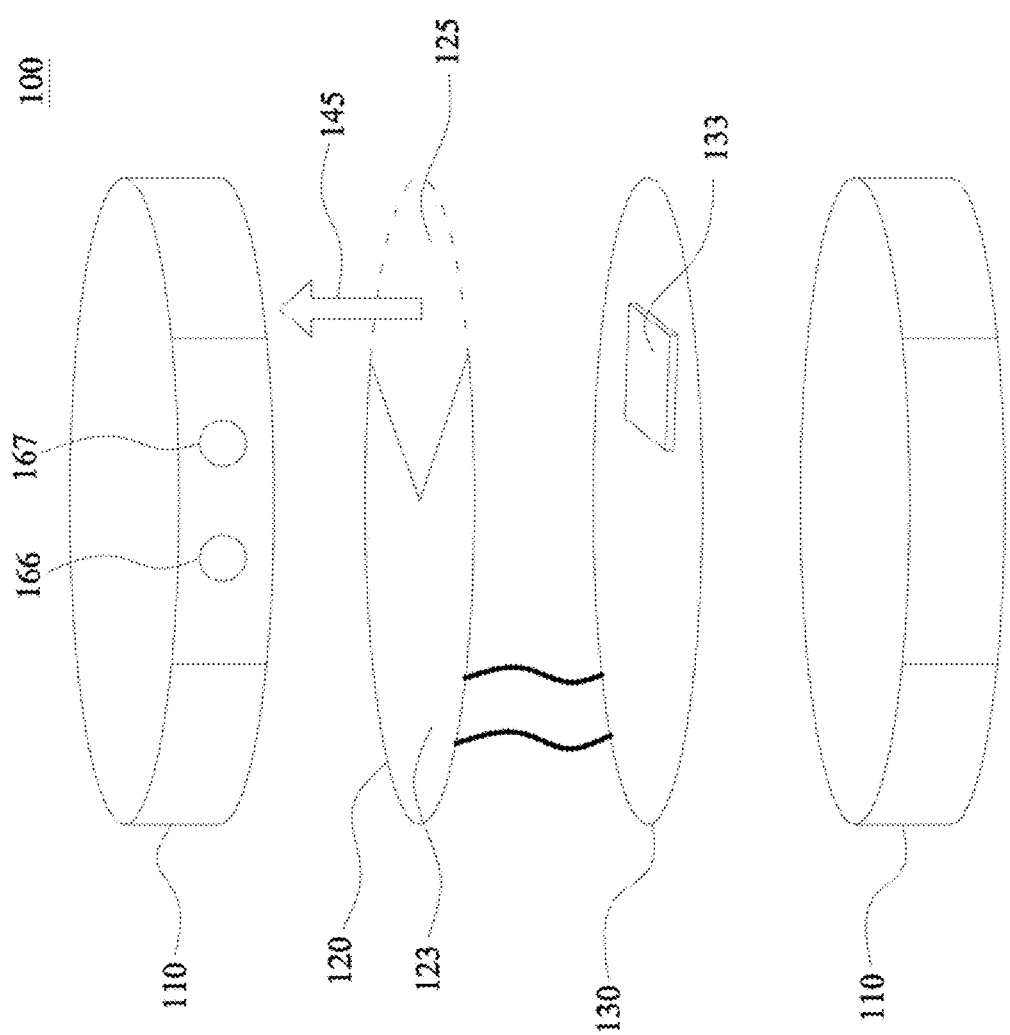
FIG. 1 is a schematic diagram of a signal transmitter with adjustable signal power in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc, may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Reference is made first to FIG. 1. FIG. 1 is a schematic diagram of a signal transmitter 100 with adjustable signal power in accordance with one embodiment of the present disclosure. In one embodiment, the signal transmitter 100 is a low-power bluetooth transmitter. The signal transmitter 100 includes a housing 110 (as illustrated in FIG. 1, the housing 110 includes an upper part and a lower part), a first adjustable metal shielding layer 120 and a circuit board 130. The material of the housing 110 can be plastics, rubber, silicone rubber or acrylics, but is not limited thereto. The material of the first adjustable metal shielding layer 120 can be metal like copper or tin, but is not limited thereto.

The first adjustable metal shielding layer 120 is disposed within the housing 110. The area of the first adjustable metal shielding layer 120 consists of a first shielding area 123 and a first un-shielding area 125. The first shielding area 123 and the first un-shielding area 125 are adjustable. In one embodiment, a user can manually adjust the first adjustable metal shielding layer 120 to change the first shielding area 123 and the first un-shielding area 125. As an example, the first adjustable metal shielding layer 120 includes a rotatable structure, and can be divided into a plurality of fan-shaped plates. The user can manually operate the rotatable structure to overlap or split the fan-shaped plates such that the first shielding area 123 and the first un-shielding area 125 are changed. In another embodiment, the first adjustable metal shielding layer 120 consists of a plurality of removable sub-plates. The removable sub-plates have connective structures, and the user can manually remove some sub-plates to change the first shielding area 123, the first un-shielding area 125, and the location and the direction of the first un-shielding area 125.

The circuit board 130 is disposed within the housing 110, and located below the first adjustable metal shielding layer 120. The circuit board 130 is electrically connected with the first adjustable metal shielding layer 120, and includes a signal emission chip 133. The signal emission chip 133 is configured for adjusting signal emission power to emit a signal (not depicted) according to the first un-shielding area 125 of the first adjustable metal shielding layer 120. In one embodiment, the signal transmitter 100 further includes a detection unit (not depicted). The detection unit is configured for detecting the first un-shielding area 125 of the first adjustable metal shielding layer 120, and outputting a corresponding control signal to the signal emission chip 133 according to a detection result such that the signal emission chip 133 adjusts the signal emission power according to the control signal. In another embodiment, buttons 166 and 167 can be selectively disposed on the housing 110. The user can operate the buttons 166 and 167 to generate and transmit an improving instruction or a lowering instruction to the signal emission chip 133 to improve or to lower the signal emission power. In another embodiment, the signal transmitter 100 further includes variable resistor (not depicted). The variable resistor can change its resistance value according to the first un-shielding area 125 of the first adjustable metal shielding layer 120. The signal emission chip 133 can adjust the signal emission power according to the abovementioned resistance value.

In another embodiment, the buttons 166 and 167, the detection unit or the variable resistor can be utilized such that when the first shielding area 123 increases, the signal emission chip 133 adjusting the signal emission power is to lower the signal emission power; and when the first shielding area 123 decreases, the signal emission chip 133 adjusting the signal emission power is to improve the signal emission power. Therefore, the user can adjust the signal emission power of the signal emission chip 133 by adjusting the first shielding area 123 (or the first un-shielding area 125) of the first adjustable metal shielding layer 120.

Moreover, the first shielding area 123 of the first adjustable metal shielding layer 120 is capable of shielding the signal emitted by the signal emission chip 133. Therefore, the user can also control the direction of the signal emitted by the signal emission chip 133 by adjusting the first shielding area 123 (or the first un-shielding area 125) of the first adjustable metal shielding layer 120. In one embodiment, the signal emitted by the signal emission chip 133 after adjusting the signal emission power according to the first un-shielding area 125 of the first adjustable metal shielding layer 120 includes a direction 145 corresponding to the first un-shielding area 125. To be more specific, part of the signal emitted by the signal emission chip 133 will be shielded by the first metal shielding area 123, and only part of the signal emitted by the signal emission chip 133 which corresponds to the first un-shielding area 125 can be transmitted outside the signal transmitter 100. Therefore, the signal can only be transmitted outside the signal transmitter 100 on the direction 145 corresponding to the first un-shielding area 125. In other words, the signal emitted from the signal transmitter 100 has a direction. It has to be explained that in the present embodiment, the direction 145 parallels the normal direction from the first un-shielding area 125 of the first adjustable metal shielding layer 120, but is not limited thereto. In practical applications, the direction 145 is related to the location and size of the first un-shielding area 125 such that only the mobile device on the vertical direction corresponding to the first un-shielding area 125 can receive the signal emitted by the signal transmitter 100. The signal emitted by the signal emission chip 133 may have different directions when the signal passes through first un-shielding areas with different locations or sizes.

Figure 2:
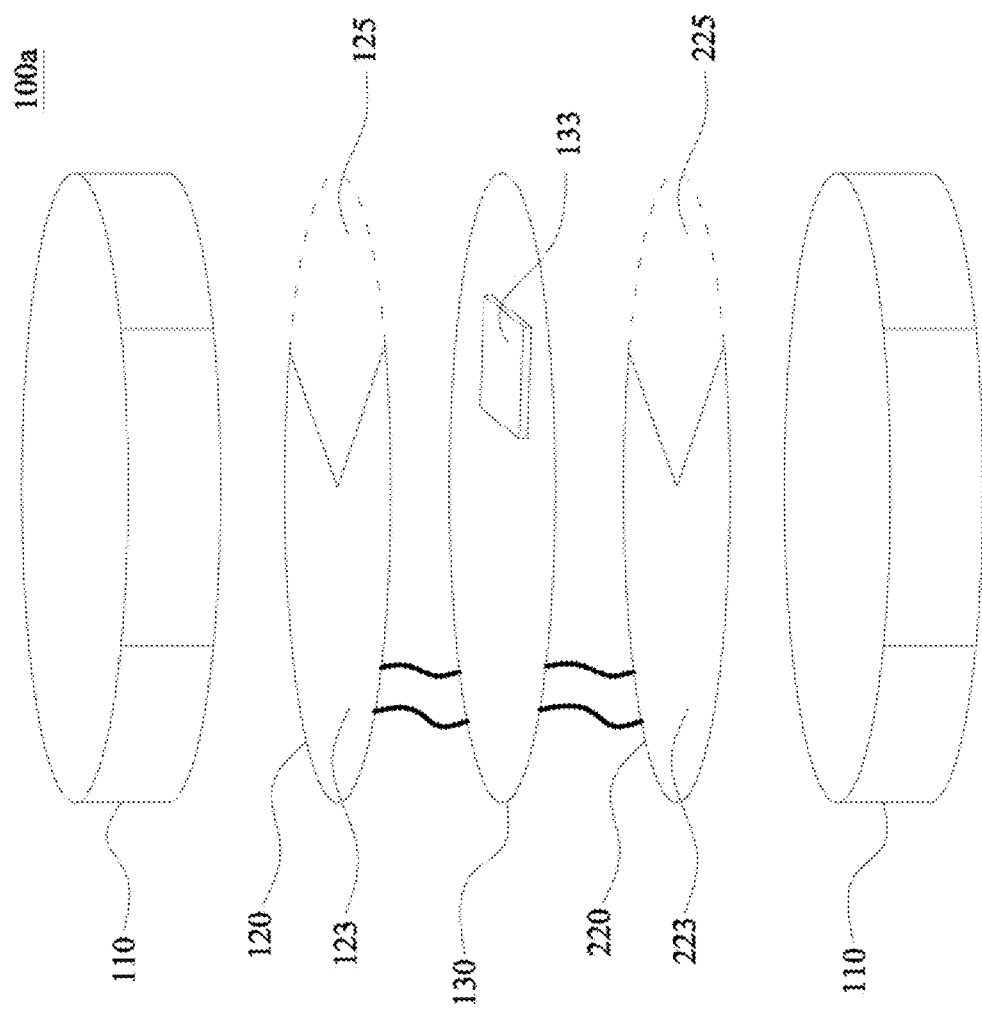
FIG. 2 is a schematic diagram of a signal transmitter with adjustable signal power in accordance with one embodiment of the present disclosure.

Reference is made also to FIG. 2. FIG. 2 is a schematic diagram of a signal transmitter 100a with adjustable signal power in accordance with one embodiment of the present disclosure. Compared with the signal transmitter 100 illustrated in FIG. 1 in the present embodiment, the signal transmitter 100a further includes a second adjustable metal shielding layer 220. The material of the second adjustable metal shielding layer 220 can be metal like copper or tin, but is not limited thereto.

The second adjustable metal shielding layer 220 is disposed within the housing 110. The area of the second adjustable metal shielding layer 220 consists of a second shielding area 223 and a second un-shielding area 225. The second shielding area 223 and the second un-shielding area 225 are adjustable. Similar to the embodiment illustrated in FIG. 1, in one embodiment of the present disclosure, the user can manually adjust the second adjustable metal shielding layer 220 to change the second shielding area 223 and the second un-shielding area 225.

The signal emission chip 133 is further configured for adjusting the signal emission power to emit the signal according to the first un-shielding area 125 of the first adjustable metal shielding layer 120 and the second un-shielding area 225 of the second adjustable metal shielding layer 220. Similar to the embodiment illustrated in FIG. 1, the second adjustable metal shielding layer 220 can include a rotatable structure or a plurality of removable sub-plates such that the user can manually adjust the second shielding area 223 and the second un-shielding area 225. In one embodiment, the signal transmitter 100a further includes a detection unit (not depicted). The detection unit is configured for detecting the first un-shielding area 125 of the first adjustable metal shielding layer 120 and the second un-shielding area 225 of the second adjustable metal shielding layer 220, and outputting a corresponding control signal to the signal emission chip 133 according to a detection result such that the signal emission chip 133 adjusts the signal emission power according to the control signal. In another embodiment, the signal transmitter 100a further includes variable resistor (not depicted). The variable resistor can change its resistance value according to the first un-shielding area 125 of the first adjustable metal shielding layer 120 and the second un-shielding area 225 of the second adjustable metal shielding layer 220. The signal emission chip 133 can adjust the signal emission power according to the abovementioned resistance value.

It has to be explained that in the above embodiment, the signal transmitter 100a utilizes two adjustable metal shielding layers (i.e., the first adjustable metal shielding layer 120 and the second adjustable metal shielding layer 220) to shield the signal emitted by the signal emission chip 133 and to adjust the signal emission power for the signal emission chip 133 to emit the signal. However, in another embodiment (not depicted), the signal transmitter 100a can utilize, for example, the first adjustable metal shielding layer 120 as illustrated in FIG. 1 or FIG. 2, and utilize a third non-adjustable metal shielding layer to replace the second adjustable metal shielding layer 220. The third metal shielding layer can have a fixed un-shielding area, or have no un-shielding area. In that embodiment, the abovementioned third metal shielding layer and the first adjustable metal shielding layer 120 are utilized together to shield the signal emitted by the signal emission chip 133.

Additional reference is made to FIG. 3. FIG. 3 is a schematic diagram of a signal transmitter 100b with adjustable signal power in accordance with one embodiment of the present disclosure. Compared with the signal transmitter 100 illustrated in FIG. 1 in the present embodiment, the signal transmitter 100b further includes a step motor 310 and a control unit 320. The control unit 320 can be a chip, but is not limited thereto. In another embodiment, the buttons 166 and 167 can be selectively disposed on the housing 110, and the signal transmitter 100b can utilize the step motor 310 to adjust the first shielding area 123 and the first un-shielding area 125 according to the instructions generated from the user pressing the buttons 166 and 167. In the present embodiment, the signal emission chip 133 is further configured for receiving a signal of at least one signal generating apparatus 305 neighboring to the signal transmitter 100b to generate a corresponding distance measuring value. The at least one signal generating apparatus 305 can be a low-power bluetooth transmitter, but is not limited thereto. In one embodiment, the signal emission chip 133 generates the abovementioned corresponding distance measuring value according to the power of the signal generated by the at least one signal generating apparatus 305.

The step motor 310 is disposed within the housing 110. The step motor 310 can be utilized to adjust the first un-shielding area 125 of the first adjustable metal shielding layer 120. The control unit 320 is disposed within the housing 110, and is electrically connected with the circuit board 130 and the step motor 310. The control unit 320 is configured for controlling the step motor 310 to adjust the first un-shielding area 125 of the first adjustable metal shielding layer 120 according to the abovementioned corresponding distance measuring value. In one embodiment of the present disclosure, when the abovementioned distance measuring value decreases (i.e., the distance between the signal generating apparatus 305 and the signal transmitter 100b is closer), the control unit 320 controls the step motor 310 to adjust the first adjustable metal shielding layer 120 such that the first un-shielding area 125 decreases (i.e., the first shielding area 123 increases). Thereby, the signal emission chip 133 lowers its signal emission power and the signal emitted by the signal emission chip 133 is under more shielding from the first adjustable metal shielding layer 120. Therefore, the interface between the signal emitted by the signal emission chip 133 and the signal generated by the signal generating apparatus 305 is reduced.

Figure 4:
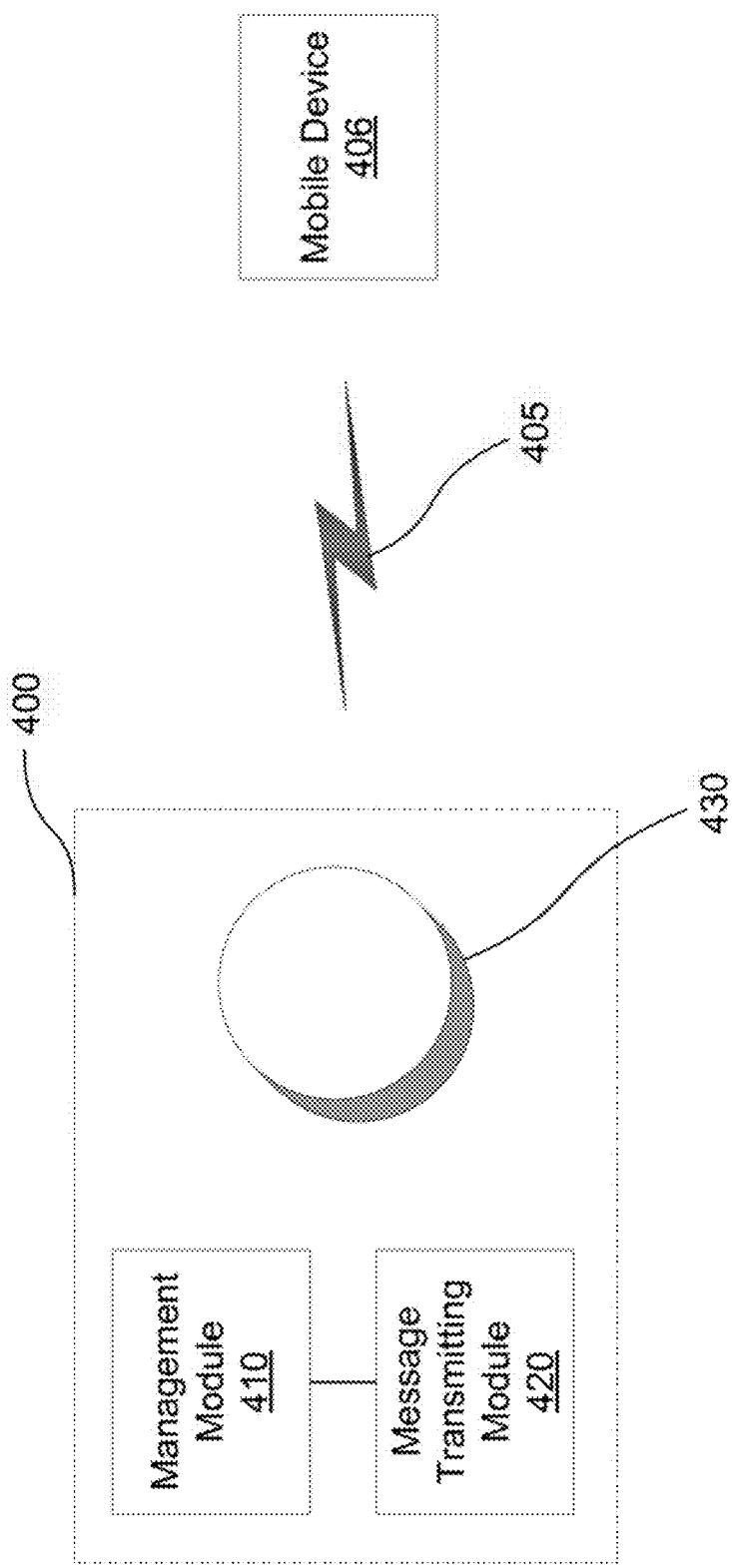
FIG. 4 is a schematic diagram of a message generating system in accordance with yet another embodiment of the present disclosure.

Reference is now made to FIG. 4. FIG. 4 is a schematic diagram of a message generating system 400 in accordance with one embodiment of the present disclosure. The message generating system 400 communicates with at least one mobile device 406 through a communication network 405. The mobile device 406 can be a smart phone, a tablet computer or a smart watch, but is not limited thereto.

The message generating system 400 includes a management module 410, a message transmitting module 420 and at least one signal transmitter 430 with adjustable signal power. The management module 410 can be a central processing unit (CPU) of a computer or a server, a control unit, micro processor, system on chip (SOC) or other hardware elements which can execute instructions, but is not limited thereto. The message transmitting module 420 is electrically connected with the management module 410. The message transmitting module 420 can be a wireless communication module (e.g., a WiFi module) of a computer or a server, but is not limited thereto. The at least one signal transmitter 430 can be the signal transmitter 100 illustrated in FIG. 1, but is not limited thereto. Each of the at least one signal transmitter 430 includes a first adjustable metal shielding layer (e.g., the first adjustable metal shielding layer 120 as illustrated in FIG. 1) and a circuit board (e.g., the circuit board 130 as illustrated in FIG. 1). The area of the first adjustable metal shielding layer consists of a first shielding area (e.g., the first shielding area 123 as illustrated in FIG. 1) and a first un-shielding area (e.g., the first un-shielding area 125 as illustrated in FIG. 1). The first shielding area and the first un-shielding area are adjustable, and the circuit board is configured for adjusting signal emission power to emit a signal according to the first un-shielding area of the first adjustable metal shielding layer. The above operations are similar to the operations disclosed in the embodiment illustrated in FIG. 1, and hence is not described again herein.

In the embodiment illustrated in FIG. 4, the mobile device 406 transmits device information to the management module 410 according to the signal emitted by the circuit board of the at least one signal transmitter 430. The management module 410 stores apparatus information of the at least one signal transmitter 430 and a corresponding message. When the management module 410 receives the device information transmitted from the mobile device 406, the management module 410 controls the message transmitting module 420 to transmit the corresponding message to the mobile device 406 according to the apparatus information corresponding to the device information.

In one embodiment of the present disclosure, the message generating system 400 includes a plurality of signal transmitters, and each of the signal transmitters emits a signal including its corresponding device information. When the mobile device 406 receives the signal emitted by one of the abovementioned signal transmitters, the mobile device 406 transmits the corresponding device information included in the signal to the management module 410. When the management module 410 receives the corresponding device information transmitted from the mobile device 406, the management module 410 compares the received device information with the stored apparatus information of signal transmitters. In one embodiment of the present disclosure, each of the abovementioned apparatus information corresponds to at least one message. The abovementioned message can be a product introducing message, an advertisement message or a guiding message, but is not limited thereto. The management module 410 then controls the message transmitting module 420 to transmit the corresponding message to the mobile device 406 according to a comparison result.

Figure 5:
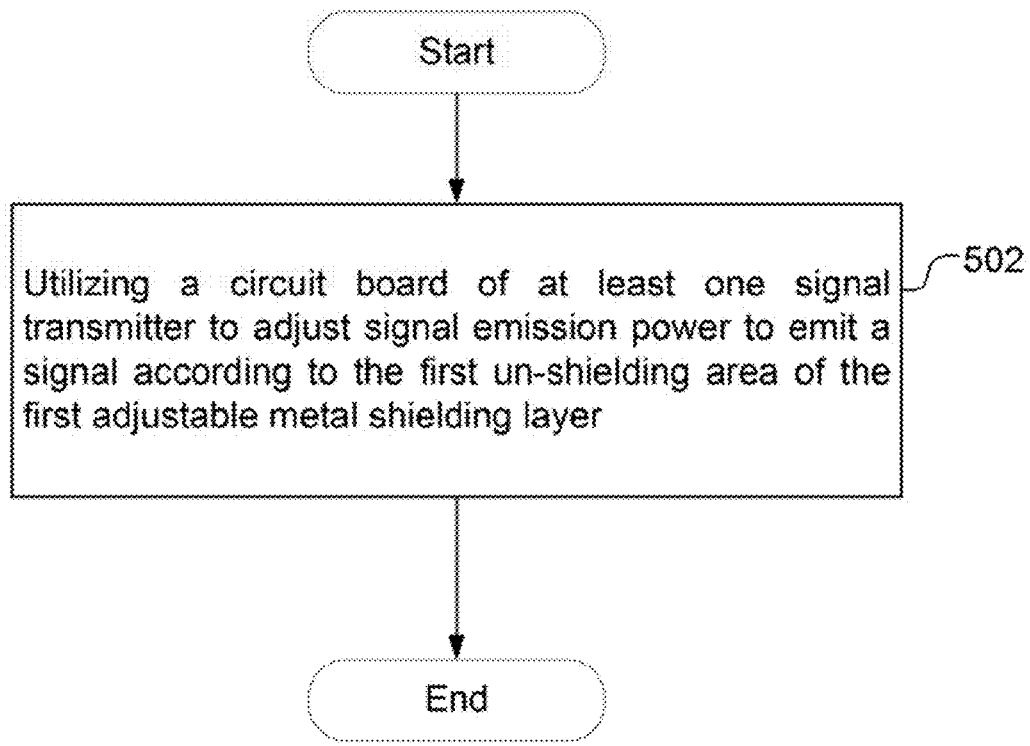
FIG. 5 is a flow chart of a signal power adjusting method in accordance with one embodiment of the present disclosure.

Reference is further made to FIG. 5. FIG. 5 is a flow chart of a signal power adjusting method in accordance with one embodiment of the present disclosure. The signal power adjusting method may be implemented by the signal transmitter 100 illustrated in FIG. 1, but is not limited in this regard. For convenience and clarity, it is assumed that the signal power adjusting method is implemented by the signal transmitter 100 illustrated in FIG. 1.

In step 502, utilizing the circuit board 130 of each of the at least one signal transmitter 100 to adjust signal emission power to emit a signal according to the first un-shielding area 125 of the first adjustable metal shielding layer 120.

According to one embodiment of the present disclosure, the signal emitted by the circuit board 130 after adjusting the signal emission power according to the first un-shielding area 125 of the first adjustable metal shielding layer 120 includes a direction 145 corresponding to the first un-shielding area 125. As explained in the previous paragraphs, the direction 145 parallels the normal direction from the first un-shielding area 125 of the first adjustable metal shielding layer 120, but is not limited thereto.

According to another embodiment of the present disclosure, utilizing the circuit board 130 of each of the at least one signal transmitter 100 to adjust the signal emission power to emit the signal according to the first un-shielding area 125 of the first adjustable metal shielding layer 120 includes: when the first shielding area 123 increases, lower the signal emission power of the circuit board 130 to emit the signal; and when the first shielding area 123 decreases, improve the signal emission power of the circuit board 130 to emit the signal.

Figure 6:
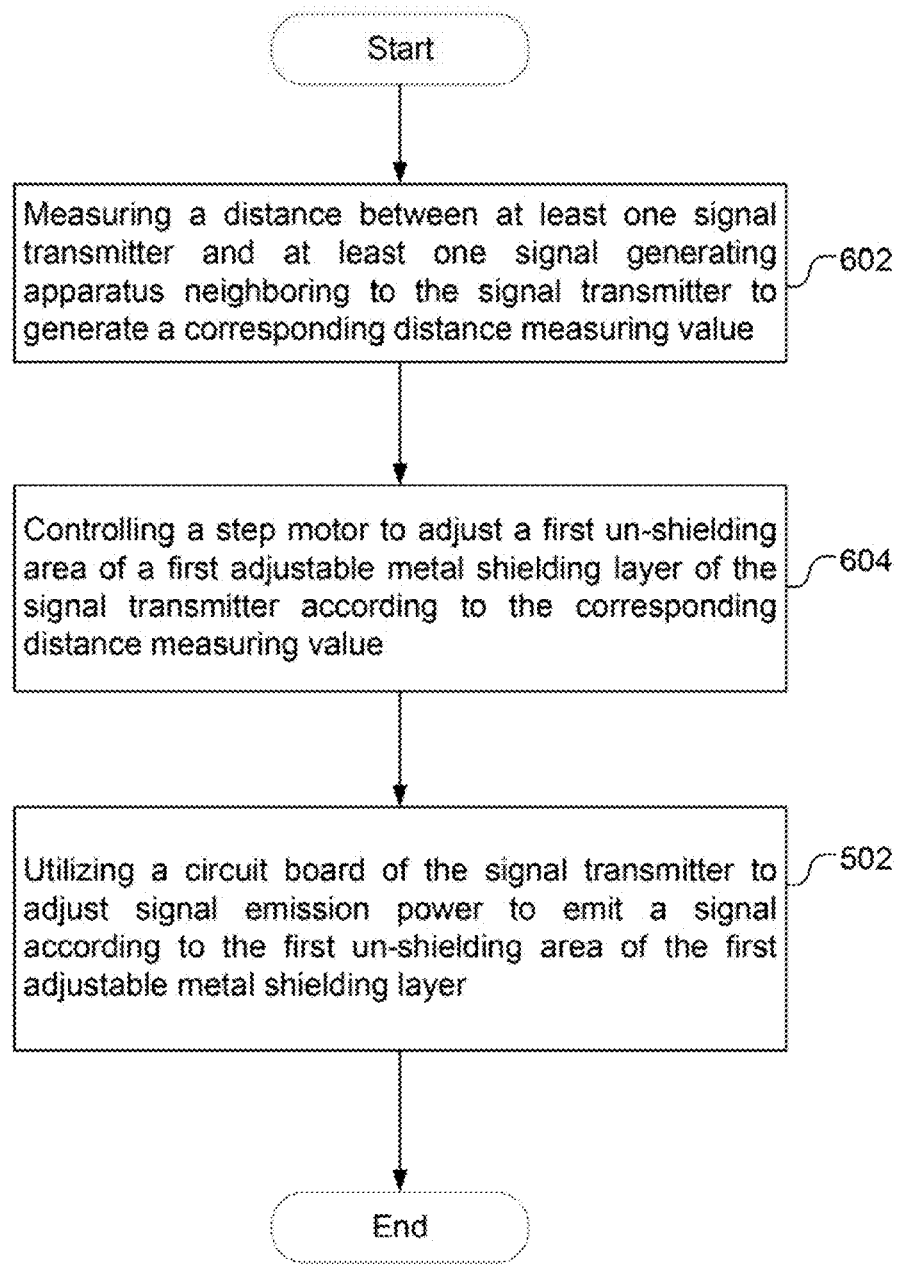
FIG. 6 is a flow chart of a signal power adjusting method in accordance with one embodiment of the present disclosure.

Reference is now made to FIG. 6. FIG. 6 is a flow chart of a signal power adjusting method in accordance with one embodiment of the present disclosure. Compared with the signal power adjusting method illustrated in FIG. 5, the signal power adjusting method illustrated in FIG. 6 further includes steps 602 and 604. The signal power adjusting method may be implemented by the signal transmitter 100b illustrated in FIG. 3, but is not limited in this regard. For convenience and clarity, it is assumed that the signal power adjusting method is implemented by the signal transmitter 100b illustrated in FIG. 3.

In step 602, the signal emission chip 133 receives the signal of at least one signal generating apparatus 305 neighboring to the signal transmitter 100b to measure a distance between the at least one signal transmitter 100b and the at least one signal generating apparatus 305 to generate a corresponding distance measuring value.

In step 604, the control unit 320 controls a step motor 310 to adjust the first un-shielding area 125 of the first adjustable metal shielding layer 120 of the at least one signal transmitter 100b according to the abovementioned corresponding distance measuring value.

The above illustrations include exemplary operations, but the operations are not necessarily performed in the order shown. Operations may be added, replaced, changed order, and/or eliminated as appropriate, in accordance with the spirit and scope of various embodiments of the present disclosure.

By applying the techniques disclosed in the present disclosure, the user can control the direction, angle and power of the signal emitted by the signal transmitter by adjusting the shielding area of the adjustable metal shielding layer of the signal transmitter. Therefore, it is easier to plan the locations for placing the signal transmitters. Moreover, the signal transmitter can measure the distance from neighboring signal transmitter by receiving the signal from the neighboring signal transmitter. The signal transmitter can adjust the shielding area of the adjustable metal shielding layer and the signal emission power according to the measured distance. Therefore, when the distance between the signal transmitter and the neighboring signal transmitter is closer, the signal transmitter can increase the shielding area of the adjustable metal shielding layer, and lowers its signal emission power. The mutual interface between the signals emitted by neighboring signal generating apparatuses can be effectively reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A signal transmitter with adjustable signal power comprising:
    a housing;
    a first adjustable metal shielding layer disposed within the housing, the area of the first adjustable metal shielding layer consisting of a first shielding area and a first un-shielding area, wherein the first shielding area and the first un-shielding area are adjustable; and
    a circuit board disposed within the housing, and located below the first adjustable metal shielding layer, the circuit board being electrically connected with the first adjustable metal shielding layer, and including a signal emission chip, wherein the signal emission chip is configured for adjusting signal emission power to emit a signal according to the first un-shielding area of the first adjustable metal shielding layer.

2. The signal transmitter of claim 1, wherein the signal emitted by the signal emission chip after adjusting the signal emission power according to the first un-shielding area of the first adjustable metal shielding layer comprises a direction corresponding to the first un-shielding area.

3. The signal transmitter of claim 1 further comprising:
    a second adjustable metal shielding layer disposed within the housing, the area of the second adjustable metal shielding layer consisting of a second shielding area and a second un-shielding area, wherein the second shielding area and the second un-shielding area are adjustable, and the signal emission chip is further configured for adjusting the signal emission power to emit the signal according to the first un-shielding area of the first adjustable metal shielding layer and the second un-shielding area of the second adjustable metal shielding layer.

4. The signal transmitter of claim 1, wherein the signal emission chip is further configured for receiving a signal of at least one signal generating apparatus neighboring to the signal transmitter to generate a corresponding distance measuring value, and the signal transmitter further comprises:
    a step motor disposed within the housing; and
    a control unit disposed within the housing and electrically connected with the circuit board and the step motor, the control unit being configured for controlling the step motor to adjust the first un-shielding area of the first adjustable metal shielding layer according to the corresponding distance measuring value.

5. The signal transmitter of claim 1, wherein when the first shielding area increases, the signal emission chip adjusting the signal emission power is to lower the signal emission power; and when the first shielding area decreases, the signal emission chip adjusting the signal emission power is to improve the signal emission power.

6. The signal transmitter of claim 1, wherein the signal transmitter is a low-power bluetooth transmitter.

7. A message generating system communicating with at least one mobile device through a communication network, wherein the message generating system comprises:
    a management module;
    a message transmitting module electrically connected with the management module; and
    at least one signal transmitter with adjustable signal power, wherein each of the at least one signal transmitter comprises a first adjustable metal shielding layer and a circuit board, the area of the first adjustable metal shielding layer consisting of a first shielding area and a first un-shielding area, wherein the first shielding area and the first un-shielding area are adjustable, and the circuit board is configured for adjusting signal emission power to emit a signal according to the first un-shielding area of the first adjustable metal shielding layer;
    wherein the at least one mobile device transmits device information to the management module according to the signal emitted by the circuit board of the at least one signal transmitter, the management module stores apparatus information of the at least one signal transmitter and a corresponding message, and when the management module receives the device information transmitted from the mobile device, the management module controls the message transmitting module to transmit the corresponding message to the mobile device according to the apparatus information corresponding to the device information.

8. The message generating system of claim 7, wherein the signal emitted by the circuit board after adjusting the signal emission power according to the first un-shielding area of the first adjustable metal shielding layer comprises a direction corresponding to the first un-shielding area.

9. The message generating system of claim 7, wherein each of the at least one signal transmitter further comprises:
    a second adjustable metal shielding layer, the area of the second adjustable metal shielding layer consisting of a second shielding area and a second un-shielding area, wherein the second shielding area and the second un-shielding area are adjustable, and the circuit board is further configured for adjusting the signal emission power to emit the signal according to the first un-shielding area of the first adjustable metal shielding layer and the second un-shielding area of the second adjustable metal shielding layer.

10. The message generating system of claim 7, wherein the circuit board is further configured for receiving a signal of at least one signal generating apparatus neighboring to the signal transmitter to generate a corresponding distance measuring value, and the at least one signal transmitter further comprises:
 a step motor; and
 a control unit electrically connected with the circuit board and the step motor, the control unit being configured for controlling the step motor to adjust the first un-shielding area of the first adjustable metal shielding layer according to the corresponding distance measuring value.

11. The message generating system of claim 7, wherein when the first shielding area increases, the circuit board adjusting the signal emission power is to lower the signal emission power; and when the first shielding area decreases, the circuit board adjusting the signal emission power is to improve the signal emission power.

12. A signal power adjusting method performed by a circuit board of at least one signal transmitter with adjustable signal power, wherein each of the at least one signal transmitter comprises a first adjustable metal shielding layer and the circuit board, the area of the first adjustable metal shielding layer consisting of a first shielding area and a first un-shielding area, wherein the first shielding area and the first un-shielding area are adjustable, and the signal power adjusting method comprises:
 utilizing the circuit board of each of the at least one signal transmitter to adjust signal emission power to emit a signal according to the first un-shielding area of the first adjustable metal shielding layer.

13. The method of claim 12, wherein the signal emitted by the circuit board after adjusting the signal emission power according to the first un-shielding area of the first adjustable metal shielding layer comprises a direction corresponding to the first un-shielding area.

14. The method of claim 12 further comprising:
 measuring a distance between the at least one signal transmitter and at least one signal generating apparatus neighboring to the signal transmitter to generate a corresponding distance measuring value; and
 controlling a step motor to adjust the first un-shielding area of the first adjustable metal shielding layer of the at least one signal transmitter according to the corresponding distance measuring value.

15. The method of claim 12, wherein utilizing the circuit board of each of the at least one signal transmitter to adjust the signal emission power to emit the signal according to the first un-shielding area of the first adjustable metal shielding layer comprises:
 when the first shielding area increases, lower the signal emission power of the circuit board to emit the signal; and when the first shielding area decreases, improve the signal emission power of the circuit board to emit the signal.

16. The method of claim 12, wherein the signal transmitter is a low-power bluetooth transmitter.

\* \* \* \* \*